Oct. 20, 1964 M. VANDENBOSS ETAL 3,153,349
ACCELERATOR ACTUATED TRANSMISSION CONTROL
Filed Aug. 14, 1962 3 Sheets-Sheet 1

INVENTOR
MAURICE VANDENBOSS
RICHARD C. HEROLD
EUGENE H. NUTTER
BY L. S. Saulsbury
ATTORNEY Oct. 20, 1964     M. VANDENBOSS ETAL     3,153,349
ACCELERATOR ACTUATED TRANSMISSION CONTROL
Filed Aug. 14, 1962     3 Sheets-Sheet 2

INVENTOR
MAURICE VANDENBOSS
RICHARD C. HEROLD
EUGENE H. NUTTER
BY L. S. Saulsbury
ATTORNEY

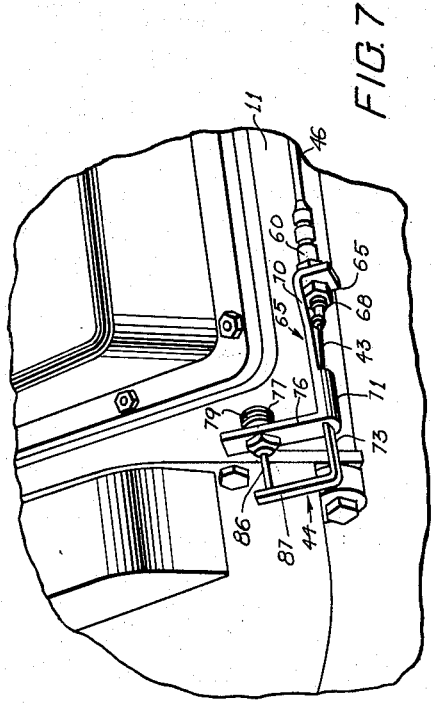
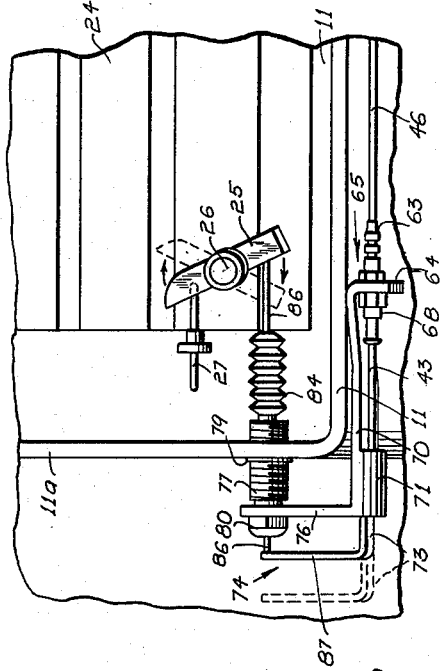
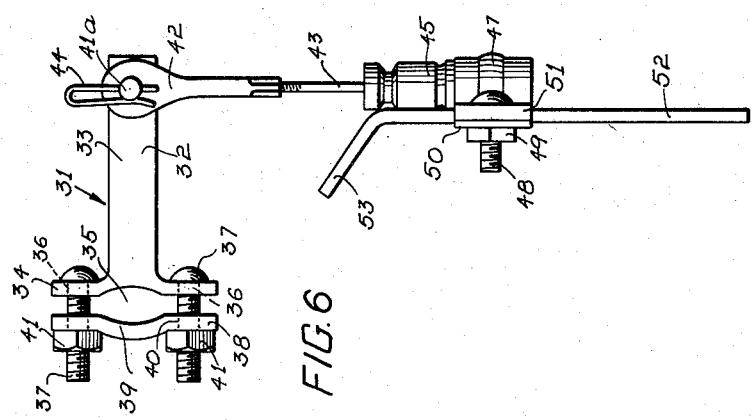

United States Patent Office 3,153,349
Patented Oct. 20, 1964

3,153,349
ACCELERATOR ACTUATED TRANSMISSION CONTROL
Maurice Vandenboss, Dunlap, Ill., Richard C. Herold, 2323 W. Howett St., Peoria, Ill., and Eugene H. Nutter, 1822 W. Butler St., Peoria, Ill.
Filed Aug. 14, 1962, Ser. No. 216,859
2 Claims. (Cl. 74—472)

This invention relates to a transmission control for vehicles having internal combustion engines controlled by a foot pedal accelerator, and automatic transmissions located rearwardly of the engine, and has as its primary object the provision of an improved means connected to the accelerator linkage which mechanically controls the oil pressure in an automatic transmission in accordance with the position of the accelerator.

An additional important object of the invention is the provision of means of this character, which may, if desired, be sold in kit form which can be readily attached or applied to the engine and/or transmission with a minimum of time, effort and difficulty.

A still further object of the invention is the provision of a device of this character which may be employed either temporarily or permanently to replace a vacuum control solenoid on an automatic transmission so controlled which has become damaged or worn to an extent to be unsatisfactory.

A further important object of the invention is the provision of a device of this character which is connected to or associated with an internal valve control lever in the transmission, rather than an external component thereof.

A still further object of the invention is the provision of a device of this character which may be readily applied or attached to any conventional internal combustion engine which is accelerator controlled, and which is associated with an automatic transmission.

Still another object of the invention is the provision of a device of this character which is sturdy and durable in construction, reliable and efficient in operation, and relatively simple and inexpensive to manufacture, install and utilize.

Still other objects reside in the combinations of elements, arrangements of parts, and features of construction, all as will be more fully pointed out hereinafter and disclosed in the accompanying drawings wherein there is shown a preferred embodiment of this inventive concept.

In the drawings:

FIG. 6 is an end elevational view of a constructional component at the opposite end of the device.

FIG. 7 is a fragmentary perspective view showing the attachment of one end of the device to the automatic transmission, and FIG. 8 is a fragmentary sectional view taken through the transmission casing showing the internal connection of the apparatus with an operating handle for a transmission control valve.

Similar reference characters refer to similar parts throughout the several views of the drawings.

Figure 1:
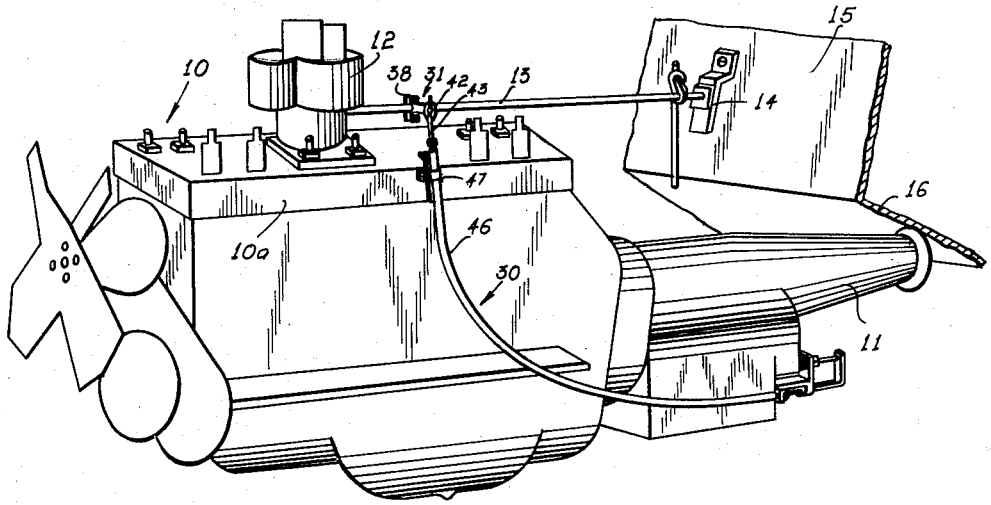
FIGURE 1 is a perspective view of a conventional internal combustion engine shown in association with a transmission and a fragment of the vehicle floor board showing the device of the instant invention attached thereto.
Figure 2:
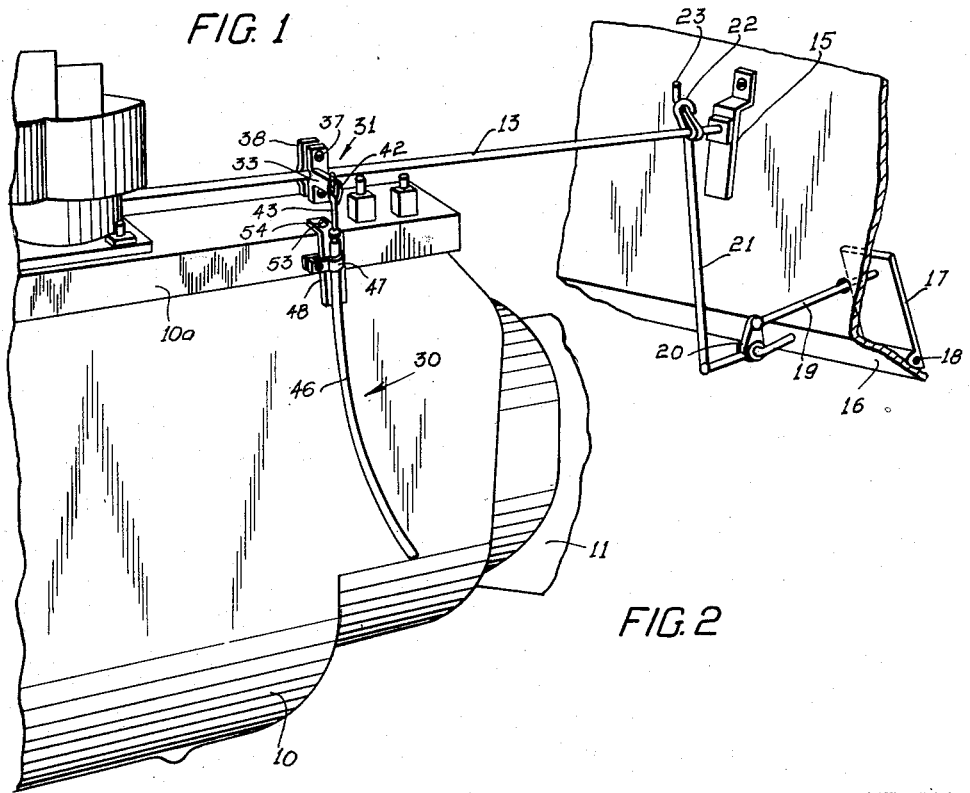
FIG. 2 is an enlarged fragmentary view, similar to FIG. 1, parts thereof being broken away showing the linkage of the accelerator pedal to the control rod.

As conducive to a clearer understanding of the operation of this invention it may here be pointed out that in certain types of internal combustion engines, particularly for pleasure vehicles, associated with automatic transmission, the shifting of the gearing in the automatic transmission is effectuated by the movement of a valve or valves interiorly of the transmission case, which in turn is effectuated by means of a solenoid, the energization of which is effectuated by a vacuum line extending to the intake manifold of the engine. This is particularly true in the case of Nash Rambler engines from 1957 through 1962, and for which the instant invention is primarily adapted, although not necessarily limited thereto. This vacuum control has been found successful and advantageous in many instances. It is, however, subject to wear and damage in its normal components, and when so damaged or worn replacement thereof is a difficult, time consuming and tedious operation. An important object of this invention is, therefore, the provision of an attachment which may be substituted for the vacuum solenoid, and which will operate effectually to control the internally positioned transmission valve or valves in accordance with pressure exerted on the accelerator, and which may be installed either initially or as a substitute for the vacuum solenoid assembly with a minimum of time, effort and difficulty, and which after installation will be inexpensive to use, as well as extremely durable and reliable, thus requiring no further replacement normally for the life of the engine.

Having reference now to the drawings in detail, there is generally indicated at 10 a conventional internal combustion engine which is shown illustratively as the Rambler American L-head engine assembly and which is provided with an automatic transmission positioned in a case or housing 11, and from which a drive shaft or carburetor control rod (not shown) extends to the usual driving components of the vehicle. The engine 10 is provided with a carburetor which is controlled by a rotatable shaft 13, one end of which is journalled in a bracket 14 carried by the lower dash 15 of the vehicle above the inclined floor board 16 normally associated with such a vehicle. Control of the rod 13 is effected by means of an accelerator pedal 17 pivotally mounted as at 18 interiorly of the floor board 16. The accelerator pedal when pressed downwardly moves a rod 19 which through a linkage 20 and a rod 21 having a hook 22 at one end thereof moves an arm 23 which is connected to carburetor control rod 13 and rotates the same. Suitable conventional spring means (not shown) serve to return the accelerator pedal 17 and its associated carburetor control rod 13 to normal position upon release of foot pressure on the accelerator pedal.

In the normal use and operation of the device control of fluid to the transmission mechanism 24 is effectuated by means of a valve (not shown), which is in turn actuated by a valve control lever or valve actuating member 25 pivotally mounted as at 26 on casing 11. Pivotal movement of the member 25, as shown in FIG. 8, controls the valve operating lever 27, which in turn controls an internal valve, not shown. Control of the member 25 is in turn effectuated through a solenoid actuated core, the actuation of which in turn is controlled by the vacuum pressure in the intake manifold of the engine. It is under conditions when such mechanism, which is conventional and not shown in the drawings of the instant application, fails that the mechanical linkage of the instant invention is employed.

The device of the instant invention is generally indicated at 30, and comprises a fitting or clamping member generally indicated at 31 which is attached to throttle or accelerator rod 13. Clamping member 31 comprises, as best shown in FIG. 6, a T-shaped member 32 having a stem 33 and a head 34 with an arcuate recess 35 therein. Suitable bores 36 extend through the opposite portions of head 34, and are provided with screws 37. A clamping plate 38 including an arcuate center portion 39 is provided with apertures 40 through which bolts 37 extend. By means of suitable nuts 41 the plate 38 is clamped about rod 13 securely to hold the stem 33 in laterally extending position relative thereto.

The end of stem or shank 33 is provided with an opening through which extends a pin 41a, to which is secured the looped end fitting 42 of a flexible control rod 43, a cotter pin 44 extended through a suitable opening in pin 41a serving to secure the parts in related assembly.

Control rod 43 extends into a fitting 45 which is fixedly secured to a tubular flexible sheath 46, the purpose of which will be more fully described hereinafter.

Fitting 45 is mounted by means of a strap 47 which is secured by bolts 48 and nuts 49 to a plate 50, which is in turn secured to a crossarm 51 of a mounting bracket 52. The mounting bracket has an angularly offset end extremity 53 which is secured by means of a screw 54 to the head 10a of engine 10.

The opposite end of sheath 46 and its associated flexible wire or rod 43 are mounted in a fitting 60, which includes a bore 61 in which the end of the outer covering or sheath 46 seats and a reduced coaxial bore 62 through which the end of the wire or cable 43 extends. A shoulder 63 is provided which seats against one side of the right angularly disposed extremity 64 of a bracket or guide member generally indicated at 65. Extremity 64 has an opening 66 through which extends an unthreaded section 67 of a threaded terminal portion 68, a nut 69 serving to hold the parts in related assembly. Guide 65 also includes a main body portion 70 which has, at the end opposite portion 64, an enlarged boss 71 having a transversely elongated slot 72 therein in which is slidably positioned one leg 73 of a plate-like L-shaped operating member generally indicated at 74. The end of wire or cable 43 is secured as at 75 to leg 73, and consequently movement of accelerator or throttle control rod 13 is transmitted through flexible rod or cable 43 to linear movement of leg 73.

Guide 65 also has an oppositely disposed right angular portion 76 which is apertured to receive one end of a threaded plug member 77, the end of which is countersunk as at 78 and which is provided with a coaxial bore 79. A clamping nut 80 seats on the portion adjacent the countersunk end 78, and holds the parts in related assembly.

A sealing ring 81 is adapted closely to engage the adjacent wall 11a of transmission case or housing 11 which is suitably apertured to receive plug 77.

The end of plug 77 interiorly of case 11 is provided with a reduced end 82 having an annular groove 83 thereabout to which is secured a bellows-type fluid tight seal 84 having an opening 85 at its opposite end, through which extends an operating or valve control rod 86, the rod also extending through the central bore 79 of plug 77 and exteriorly to a point adjacent the upstanding or right angularly disposed leg 87 of L-shaped member 74.

Valve control rod 86 is, as best shown in FIG. 8, adapted to engage one arm of valve control member 25, and be automatically moved outwardly thereby upon change of fluid pressure in the fluid transmission mechanism 24.

If desired, the entire guide assembly 65 including the end of rod 86 and the exterior portion of stud 77 may be protected by a flexible rubber boot (not shown), or similar protective covering.

Figure 3:
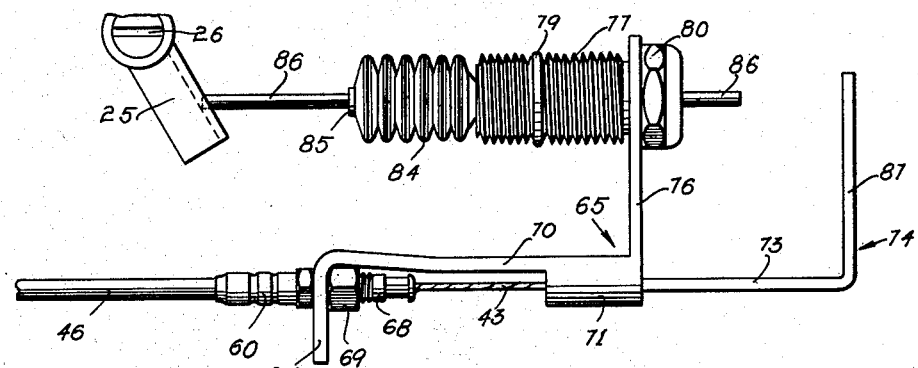
FIG. 3 is an enlarged side elevational view of a portion of the instant apparatus shown in association with a valve interiorly of the automatic transmission which it is desired to control.
Figure 4:
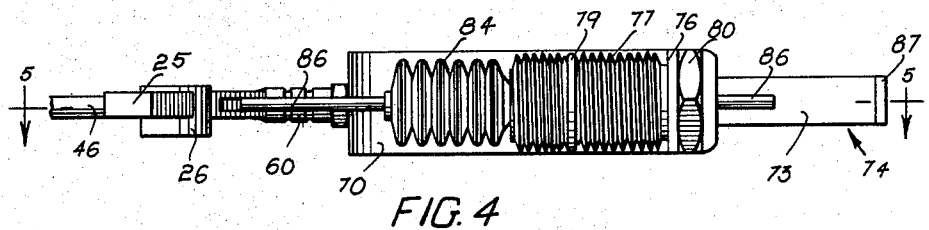
FIG. 4 is a top plan view of the structure of FIG. 3.
Figure 5:
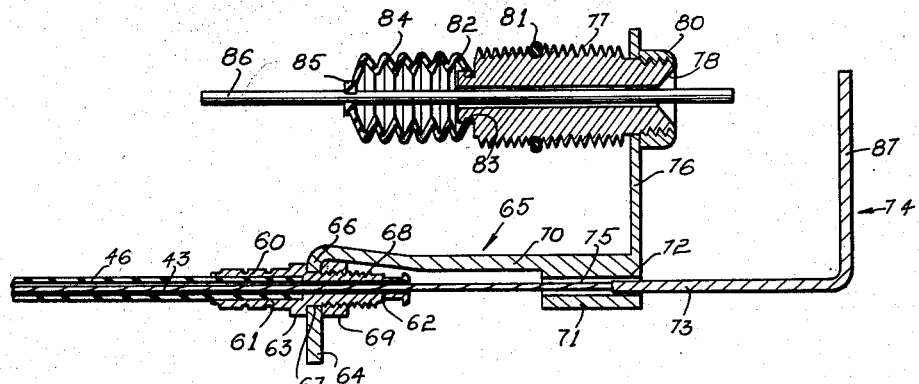
FIG. 5 is a sectional view taken substantially along the line 5—5 of FIG. 4 as viewed in the direction indicated by the arrows.

From the foregoing the operation of the device should now be readily understandable. As pressure is increased on the accelerator pedal 17 rod 13 is turned to increase the flow of gas to the carburetor 12 and consequently the speed of the vehicle. Simultaneously the shank 33 of the T-shaped member 31 is moved which in turn moves flexible rod or cord 43. Such movement in turn moves L-shaped plate 74 to cause the leg 87 thereof to engage the end 86 of the control rod, which in turn forces its opposite end against valve control member 25, which moves the internal valve in the transmission to re-route the flow of fluid therein to shift the transmission into a higher gear. As pressure on the accelerator pedal 17 is relieved, the parts remain in the position shown in FIGS. 3 to 5 until such time as the speed is reduced occasioning a re-arrangement of the fluid flow in the transmission and moving the valve actuating member 25 to a position where it moves control rod 86 outwardly. At this time the rod is ready to be re-engaged by the leg 87 as fuel is introduced to the carburetor through the rod 13, at which time the shift may be re-effectuated by the automatic movement of the control rod or wire in its associated flexible sheath 46 to reactuate the valve mechanism.

From the foregoing it will now be seen that there is herein provided an improved accelerator actuated transmission control which may be readily supplied in kit form, and attached to any desired conventional internal combustion engine either as a replacement unit for a defective solenoid vacuum operated transmission shift, or for any mechanical mechanism of similar nature which fails or wears out.

It will also be seen that there is herein provided a device which accomplishes all the objects of this invention, and others, including many advantages of great practical utility and commercial importance.

As many embodiments may be made of this inventive concept, and as many modifications may be in the embodiment hereinbefore shown and described, it is to be understood that all matter herein is to be interpreted merely as illustrative and not in a limiting sense.

We claim:

1. An automatic transmission control for a motor vehicle of the type having an internal combustion engine including a carburetor and an accelerator actuated control rod for said carburetor, and an automatic transmission including a casing, a shift control valve interiorly of said casing and an actuating member for said valve; comprising in combination a fitting secured to the carburetor control rod and movable therewith, a bracket secured to the casing, a movable element assembly carried by said bracket, the casing having an opening therein through which said movable element assembly extends into engagement with said actuating member, a flexible cable connection between said fitting and said movable element assembly, said flexible cable including an outer flexible normally stationary sleeve, an internally positioned coaxial movable flexible cable, and means for securing said outer sleeve to said engine, said bracket including an L-shaped member having a depending apertured flange through which said flexible cable extends, and a slide housing on one leg of said L-shaped member adjacent said flange, and said movable element assembly comprising an L-shaped slide having one leg movable in said slide housing, a connection between said one leg and said flexible cable, a threaded tubular bushing extending through the opening in said casing, a valve control rod slidable in said bushing, the other leg of said L-shaped member carrying said bushing, and the other end of said L-shaped slide extending into a position to engage the end of said valve control rod when said slide member is moved by said flexible cable to shift said actuating member for said valve.

2. The structure of claim 1 wherein said fitting comprises a T-shaped member including a shank secured to the end of said movable flexible cable opposite said slide, and a recessed head engageable with said accelerator actuated control rod, and a recessed clamping plate secured to said head fixedly to secure said fitting to said accelerator actuated carburetor control rod.

References Cited in the file of this patent
UNITED STATES PATENTS

| | | |
|---|---|---|
| 2,336,513 | Taylor | Dec. 14, 1943 |
| 3,083,588 | Christenson | Apr. 2, 1963 |